US012655860B2

(12) United States Patent
Doran

(10) Patent No.: US 12,655,860 B2
(45) Date of Patent: Jun. 16, 2026

(54) Z-CLIP WITH ANGLED BASE FOR DEPTH ALIGNMENT

(71) Applicant: Wexford Innovations, LLC, Petaluma, CA (US)

(72) Inventor: Patrick Doran, Petaluma, CA (US)

(73) Assignee: WEXFORD INNOVATIONS, LLC, Petaluma, CA (US)

( * ) Notice: Subject to any disclaimer, the term of this patent is extended or adjusted under 35 U.S.C. 154(b) by 103 days.

(21) Appl. No.: 18/783,314

(22) Filed: Jul. 24, 2024

(65) Prior Publication Data

US 2025/0283493 A1 Sep. 11, 2025

Related U.S. Application Data

(63) Continuation of application No. 18/599,939, filed on Mar. 8, 2024, now Pat. No. 12,085,104.

(51) Int. Cl.
*F16B 2/14* (2006.01)
*F16B 5/12* (2006.01)

(52) U.S. Cl.
CPC ................ *F16B 2/14* (2013.01); *F16B 5/123* (2013.01)

(58) Field of Classification Search
CPC .... E04F 13/083; E04F 13/081; A47G 1/1606; E06B 1/6069; F16B 2/14
See application file for complete search history.

(56) References Cited

U.S. PATENT DOCUMENTS

| | | | |
|---|---|---|---|
| 530,766 A | 12/1894 | Gaston | |
| 1,614,221 A | 1/1927 | Westbrook | |

| | | | |
|---|---|---|---|
| 2,094,779 A | 10/1937 | Donaldson | |
| 2,914,817 A | 12/1959 | Jackson | |
| 4,165,852 A * | 8/1979 | Chervenak | F16M 11/045 |
| | | | 248/225.11 |
| 4,530,482 A * | 7/1985 | Berinson | A47G 1/1606 |
| | | | 248/475.1 |
| 4,908,952 A | 3/1990 | Joos | |
| 5,729,934 A | 3/1998 | Ochoa | |
| 7,748,182 B2 * | 7/2010 | McGee | E04B 2/7457 |
| | | | 52/287.1 |
| 7,784,751 B1 | 8/2010 | Bellows et al. | |
| 7,905,465 B1 | 3/2011 | Anwar | |

(Continued)

FOREIGN PATENT DOCUMENTS

| | | | |
|---|---|---|---|
| WO | WO 00/39425 | * | 12/1998 |

*Primary Examiner* — Brian E Glessner
*Assistant Examiner* — Daniel J Kenny
(74) *Attorney, Agent, or Firm* — INNOVATION CAPITAL LAW GROUP, LLC; Vic Lin

(57) ABSTRACT

A z-clip has a back side member that is angled relative to the front face. A wedge is designed to be used with the z-clip, where the wedge has an angle that matches the angle of the back side member of the z-clip. Thus, the wedge can be slid under the z-clip at a desired position to angle the z-clip in its use position, while allowing the z-clip to be horizontally offset from the wall. The system provided by the z-clip and wedge can quickly and easily set z-clips on a wall to a vertical reference plane, thus providing an easy fit for a wall panel to be subsequently attached thereto. Further provided are quick offset blocks that can attach to ends of each row of z-clips to provide a way for spanning a string therebetween, thus providing a vertical reference line for aligning z-clips along the vertical reference line.

16 Claims, 8 Drawing Sheets

(56)                    References Cited

U.S. PATENT DOCUMENTS

| | | | |
|---|---|---|---|
| 8,359,811 B2 * | 1/2013 | Muller ................ | E04F 13/0819 |
| | | | 52/510 |
| 2005/0072894 A1 | 4/2005 | Grant | |
| 2009/0272055 A1 * | 11/2009 | Griffiths ............. | E04F 13/0889 |
| | | | 52/309.3 |
| 2010/0077676 A1 | 4/2010 | Dobler | |
| 2012/0304573 A1 * | 12/2012 | Aboukhalil .......... | E04F 19/061 |
| | | | 52/506.05 |
| 2019/0021524 A1 | 1/2019 | Yang | |
| 2023/0417062 A1 | 12/2023 | Giattina et al. | |

* cited by examiner

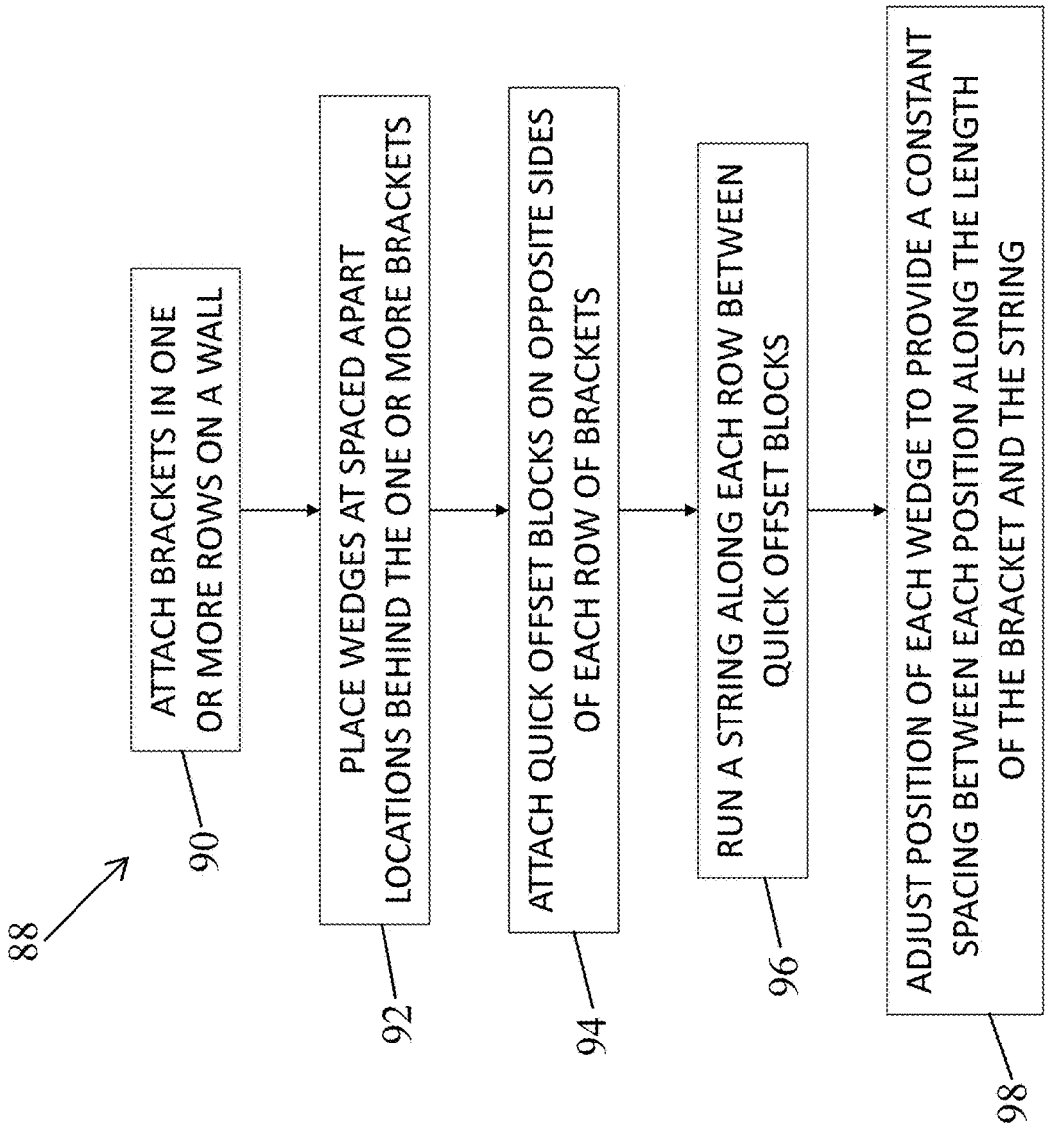

ATTACH BRACKETS IN ONE OR MORE ROWS ON A WALL

90

PLACE WEDGES AT SPACED APART LOCATIONS BEHIND THE ONE OR MORE BRACKETS

92

ATTACH QUICK OFFSET BLOCKS ON OPPOSITE SIDES OF EACH ROW OF BRACKETS

94

RUN A STRING ALONG EACH ROW BETWEEN QUICK OFFSET BLOCKS

96

ADJUST POSITION OF EACH WEDGE TO PROVIDE A CONSTANT SPACING BETWEEN EACH POSITION ALONG THE LENGTH OF THE BRACKET AND THE STRING

Z-CLIP WITH ANGLED BASE FOR DEPTH ALIGNMENT

CROSS-REFERENCE TO RELATED APPLICATIONS

This application is a continuation of U.S. patent application Ser. No. 18/599,939, filed Mar. 8, 2024, the contents of which are herein incorporated by reference.

BACKGROUND OF THE INVENTION

1. Field of the Invention

Embodiments of the invention relate generally to brackets and mounting systems. More particularly, embodiments of the invention relate to a z-clip bracket that can easily adjust its mounted distance horizontally from a wall.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Architectural panels are well known in the building trade and are often used to cover existing wall surfaces to create a specific design element or effect.

It is well known to hang architectural panels using panel clips, also commonly referred to as panel "Z" clips, or simply z-clips, which have lower portion for placement against a wall, and an upper portion, extending upward and spaced apart from the wall. In use, a first z-clip can be attached to the wall. A second z-clip can be attached to the back of the panel such that it has an upper portion attached to the back of the panel, and a lower portion extending downward and spaced apart from the back of the panel. The panel is hung attached to the wall by placing the downward-facing, offset portion of the z-clip on the back of the panel into the upward-facing offset portion of the z-clip attached to the wall.

Panel installers need to insure that all panels will be aligned in the vertical plane so that the face of each panel will be aligned with the face of every other panel. Since the surface of a wall is not typically vertically aligned over the entire surface of the wall, a plurality of flat shims are combined to build out the surface of the wall to a vertical reference, typically at the location of each wall stud where each panel clip is to be located.

The shims are installed such that the outward-facing surface of each shimmed area is in vertical alignment with the outward-facing surface of every other shimmed area. The shims are typically secured in place by nails, screws and/or glue, in accordance with the installer's preference.

The process of shimming out the z-clips to a vertical reference plane can prove difficult and time consuming. Further, the installer would need a plurality of shims of varying sizes to ensure the z-clips confirm to the vertical reference plane.

In view of the foregoing, there is a need for a convenient and easy-to-use system and method of applying z-clips to a wall and adjusting their horizontal offset from the wall to provide a vertical reference plane.

SUMMARY OF THE INVENTION

Embodiments of the present invention aim to solve the aforementioned problems in conventional mounting systems by providing a z-clip that can be easily horizontally adjusted with respect to the wall on which it is mounted.

Embodiments of the present invention provide a mounting system comprising a bracket, the bracket including a main body having a main body front side and a main body back side; a lower portion, extending from and formed integrally with the main body, having at least one hole therein for a fastener to extend there through for attaching the bracket to a surface, the lower portion having a back side continuous and linear with the main body back side, the back side of the lower portion and the main body back side defining a bracket back side; an upper portion extending in a direction opposite the lower leg, wherein a back side of the upper leg is spaced away from the surface when the lower leg is attached to the surface, wherein the bracket back side is disposed non-parallel to a front side plane defined by the front side of the upper portion and the main body front side.

Embodiments of the present invention provide a mounting system comprising a bracket and a wedge. The bracket comprising a main body having a main body front side and a main body back side; a lower portion, extending from and formed integrally with the main body, having at least one hole therein for a fastener to extend there through for attaching the bracket to a surface, the lower portion having a back side continuous and linear with the main body back side, the back side of the lower portion and the main body back side defining a bracket back side; an upper portion extending in a direction opposite the lower leg, wherein a back side of the upper leg is spaced away from the surface when the lower leg is attached to the surface, wherein the bracket back side is disposed non-parallel to a front side plane defined by the front side of the upper portion and the main body front side. The wedge comprising a wedge back side configured to be positioned against the surface, with at least a portion of the wedge back side being disposed between the bracket and the wall; and a wedge front side configured to be slidable along the bracket back side, wherein the wedge back side and the wedge front side form a wedge angle to provide a continuously increasing thickness along a length of the wedge, from a tip end to a distal end thereof; and a position of the wedge relative to the bracket provides a continuously variable horizontal displacement of the bracket from the surface.

Embodiments of the present invention provide a method of attaching one or more brackets on a surface in a single vertical reference plane comprising placing the one or more brackets horizontally along the surface in a first row, each of the one or more brackets comprising a main body having a main body front side and a main body back side, a lower portion, extending from and formed integrally with the main body, the lower portion having a back side continuous and linear with the main body back side, the back side of the lower portion and the main body back side defining a bracket back side, an upper portion extending in a direction opposite the lower leg, wherein a back side of the upper leg is spaced away from the surface when the lower leg is attached to the surface, wherein the bracket back side is disposed non-parallel to a front side plane defined by the front side of the upper portion and the main body front side, and placing one or more wedges between each of the one or more brackets and the surface, each of the one or more wedges comprising a wedge back side positioned against the surface, with at least a portion of the wedge back side being disposed between the bracket and the wall; and a wedge front side slidable along the bracket back side, wherein the wedge back side and the wedge front side form a wedge angle to provide a continuously increasing thickness along a length of the wedge, from a tip end to a distal end thereof; and sliding each of the one or more wedges to provide a horizontal displacement of each of the one or more brackets to position each of the one or more brackets along the single vertical reference plane.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

FIGS. 14A1 and 14A2 illustrate a quick offset block for horizontally aligning the bracket(s) of FIG. 1 along a wall;

FIG. 16 illustrates an exemplary method of using the bracket of FIG. 1, the wedge of FIG. 2 and the quick offset block of FIGS. 14A1 and 14A2 to mount a bracket on a wall in a single vertical reference plane.

Figures 1, 2, 3, 4:
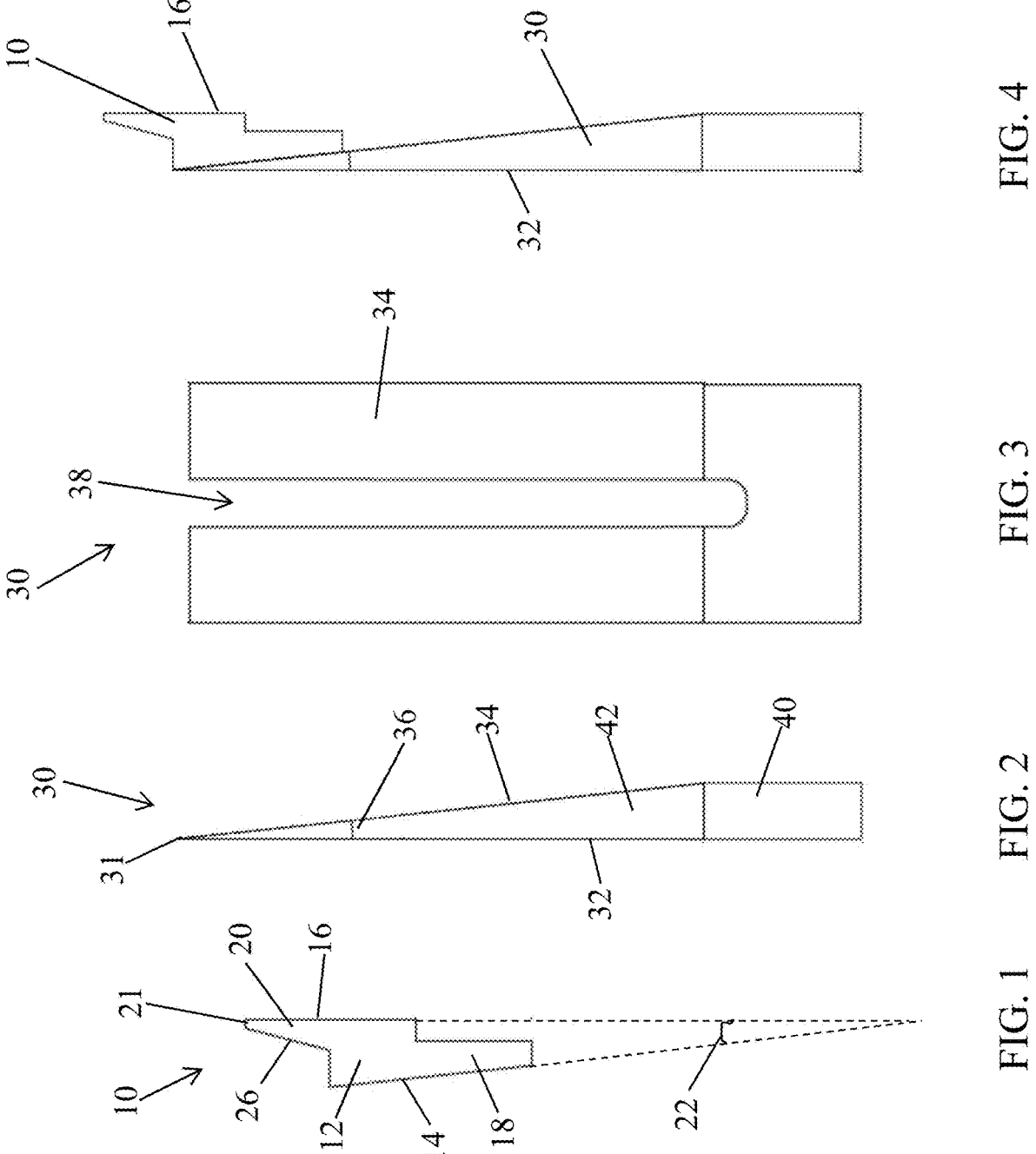
FIG. 1 illustrates a side view of a bracket according to an exemplary embodiment of the present invention.
FIG. 2 illustrates a side view of a wedge usable with the bracket of FIG. 1.
FIG. 3 illustrates a top view of the wedge of FIG. 2.
FIG. 4 illustrates an engagement of the bracket of FIG. 1 with the wedge of FIG. 2.
Figure 7:
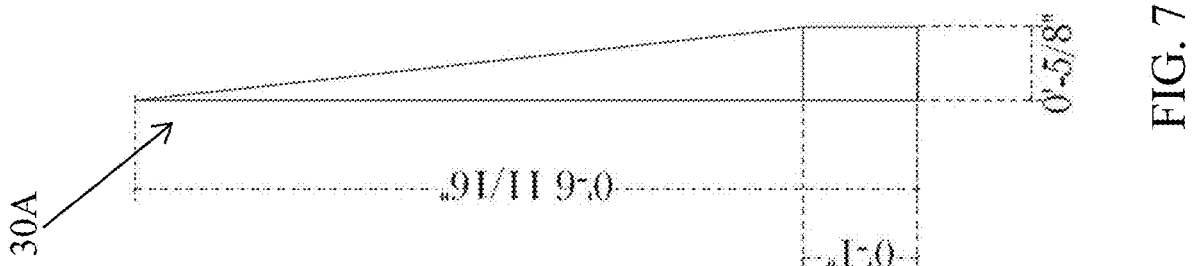
FIG. 7 illustrates a side view of the wedge of FIG. 2, showing another example of measurements of the wedge applied thereto.
Figure 6:
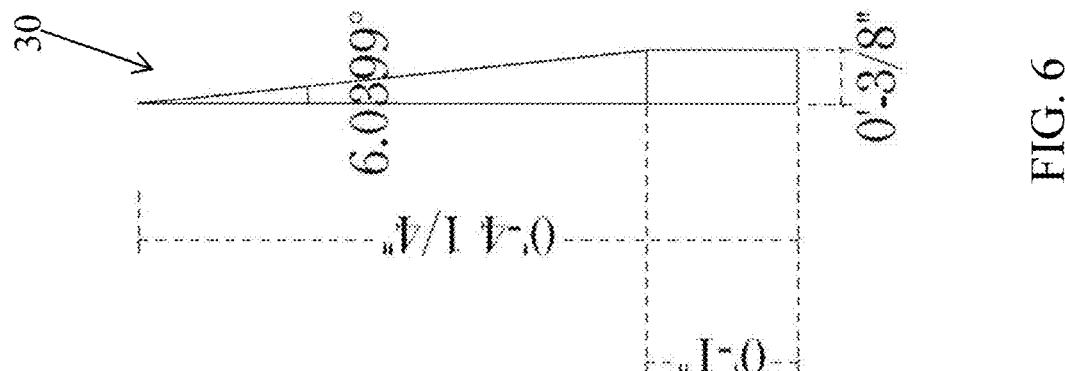
FIG. 6 illustrates a side view of the wedge of FIG. 2, showing one example of measurements of the wedge applied thereto.
Figure 5:
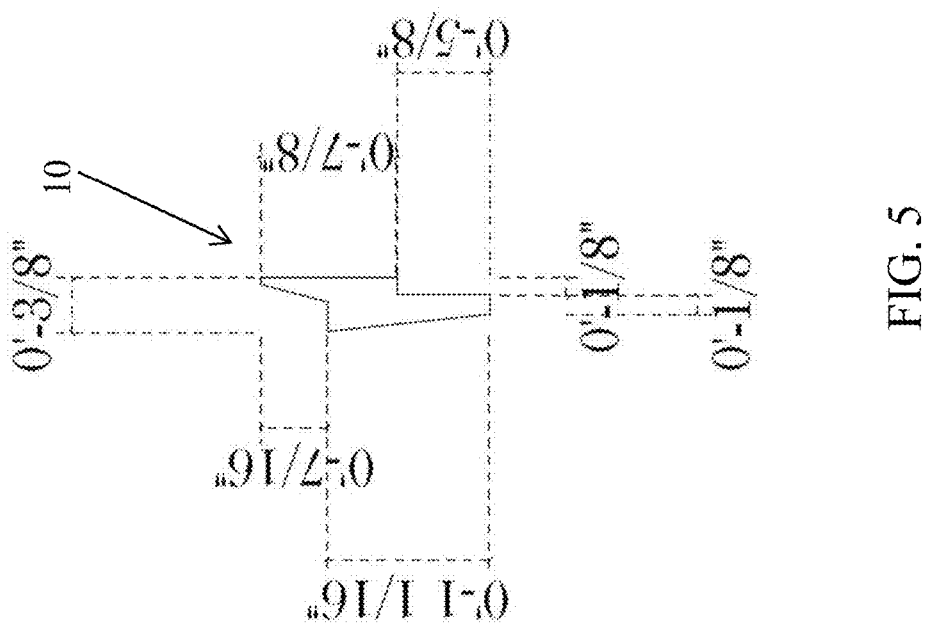
FIG. 5 illustrates a side view of the bracket of FIG. 1, showing one example of measurements of the bracket applied thereto.

The illustrations in the figures may not necessarily be drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature (s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a z-clip having a back side member that is angled relative to the front face. A wedge is designed to be used with the z-clip, where the wedge has an angle that matches the angle of the back side member of the z-clip. Thus, the wedge can be slid under the z-clip at a desired position to angle the z-clip in its use position, while allowing the z-clip to be horizontally offset from the wall. The system provided by the z-clip and wedge can quickly and easily set z-clips on a wall to a vertical reference plane, thus providing an easy fit for a wall panel to be subsequently attached thereto. Further provided are quick offset blocks that can attach to ends of each row of z-clips to provide a means for spanning a string therebetween, thus providing a vertical reference line for aligning z-clips along the vertical reference line.

Referring now to FIG. 1, a bracket 10 (also referred to as a z-clip 10) can include a main body 12 having a back side 14 that faces a wall when in use, as described below. The main body 12 further includes a front side 16, opposite the back side 14. A lower portion 18 extends from the main body 12, where the back side 14 extends uniformly from the main body 12 to the lower portion 18. An upper portion 20 extends upward from the main body 12, where the front side 16 extends uniformly from the main body to the upper portion 20. A back side 26 of the upper portion 20 can be spaced apart from the back side 14 of the main body 12. Typically, the back side 26 of the upper portion 20 is angled so that the upper portion 20 is wider (where width is along the direction from the back side 14 to the front side 16 of the main body) at its lower end (where the upper portion 20 extends from the main body 12) and narrows toward its distal end 21. Such an angle may vary and, in some embodiments, the back side 26 of the upper portion 20 may be parallel to the front side 16.

A mounting hole 24 (see FIGS. 14A1 through 14C) may be provided through the lower portion 18. The mounting hole may be configured to receive a fastener, as described below, to attach the bracket 10 to the wall.

As can be seen by the dashed lines in FIG. 1, the back side 14 may be angled relative to the front side 16. The angle 22 may be from about 4 to about 10 degrees, typically about 5 to 8 degrees, often about 6 degrees.

Referring also to FIGS. 2 through 4, a wedge 30 can be provided with a back side 32 and a front side 34, where the front side and back side are angled at an angle 36 to terminate at a tip 31 thereof. In some embodiments, as shown in FIG. 2, for example, the wedge 30 can include a sloped portion 42 and a non-sloped portion 40, where the front side 34 and the back side 32 are parallel at the non-sloped portion 40 and are relatively angled at the sloped portion 42.

The wedge 30 can include a slot 38 formed from the front side 34 to the back side 32. The slot 38 can extend from the tip 31 and extend along the sloped portion 42 and terminate at or slightly into the non-sloped portion 40. When the fastener extends through the hole 24 of the bracket 10, the wedge 30 may be slid under the bracket 10, from a bottom side of thereof, with the hole 24 aligning with the slot 38 of the wedge 30. As shown in FIG. 4, when the front side 34 of the wedge is positioned against the back side 14 of the bracket 10, the front side 16 of the bracket 10 may be substantially parallel with the back side 32 of the wedge. When positioned against the wall, the front side 16 of the bracket 10 may be substantially parallel with the wall. Such a feature is due to the angle 36 of the wedge 30 being matched to the angle 22 of the bracket 10. The wedge 30 may be slid an appropriate amount under the bracket 10, as discussed below, to provide a continuously variable amount of displacement of the bracket 10 from the wall. Unlike shims that are provided in different thicknesses, the wedge can provide a continuously variable displacement.

FIGS. 5 through 8 show exemplary dimensions form the bracket 10, wedge 30 and another embodiment of a wedge 30A. As can be seen, wedge 30 can provide from zero inch to about ¼ inch displacement of the bracket from the wall. If further displacement is needed, wedge 30A may be chosen, where the bracket may be positioned from zero inch to about ½ inch from the wall. As can be seen, due to the wedge 30 and wedge 30A having the same angle (matching angle 22 of bracket 10), the wedge 30A is made longer to as to end at tip 31. In some embodiments, the end of the wedge 30A (adjacent to tip 31) may be removed, so that wedge 30A ends at the dashed line 33. Such a design may be useful where both wedge 30 and wedge 30A are provided, as wedge 30 can provide adjustments from 0 to ⅜ inch, while wedge 30A may provide adjustments from, for example, ¼ inch to ⅝ inch. Tip removal may be especially useful for even thicker wedges, if needed, to shorten their overall length.

In some embodiments, a kit can be provided that includes one or more brackets 10 and a plurality of wedges 30, 30A that can provide mounting of the bracket in a single vertical reference plane. The wedges 30, 30A, as discussed above, can have angle 36 that matches the angle 22 of the bracket 10, where the wedges have different lengths to provide different amounts of maximum horizontal displacement of the bracket 10 from the surface or wall on which it is mounted. The kit can further include at least two quick offset blocks 70, as discussed below with reference to FIGS. 14A1 through 15.

Figure 9:
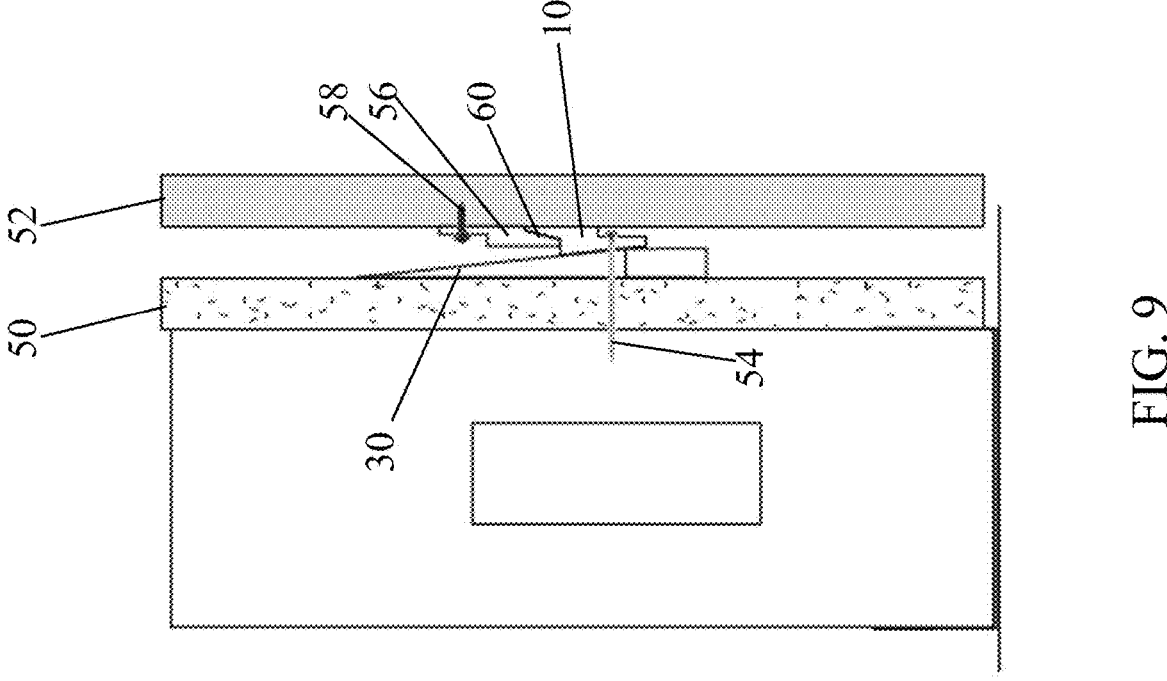
FIG. 9 illustrates the bracket of FIG. 1 and the wedge of FIG. 2 used to hang a hanging structure, according to an exemplary embodiment of the present invention.
Figure 8:
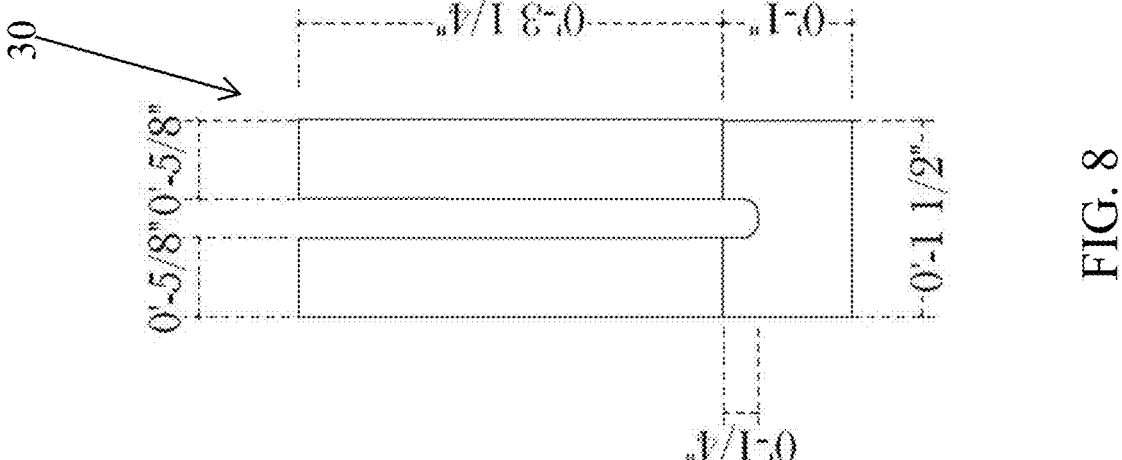
FIG. 8 illustrates a top view of the wedge of FIG. 2, showing one example of measurements of the wedge applied thereto.

Referring now to FIGS. 1, 2 and 9, the bracket 10 is attached to wall 50 with fastener 54. The wedge 30 is positioned between the back side 14 of the bracket 10 and the wall 50 so that the front side 16 of the bracket 10 is substantially parallel to the wall 50. A wall panel 52 can include a z-clip bracket 56 attached thereto with a fastener 58. A lower portion 60 of the z-clip bracket 56 can fit behind the upper portion 20 of bracket 10, as shown in FIG. 9.

Figures 10, 11:
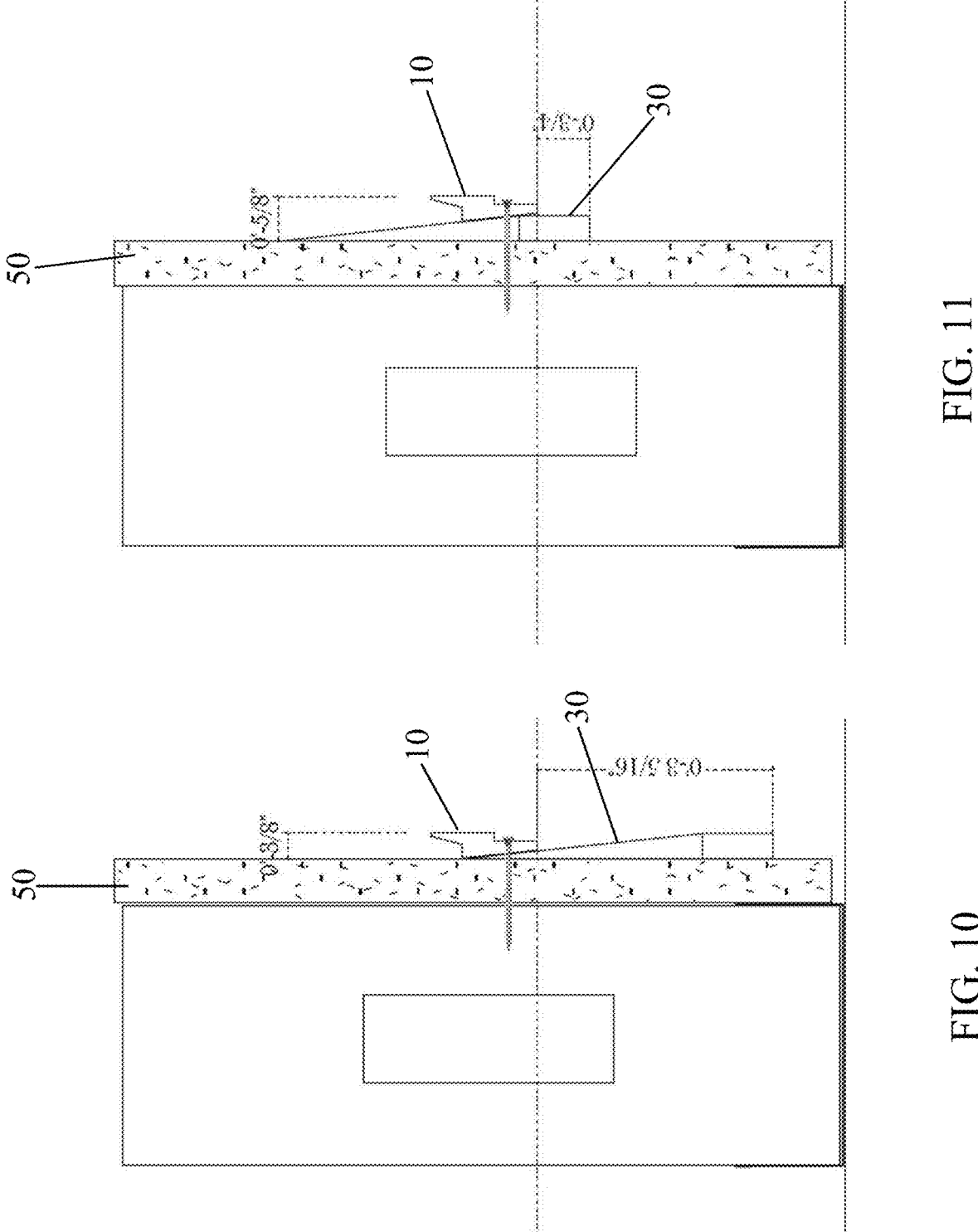
FIG. 10 illustrates the bracket of FIG. 1 and the wedge of FIG. 6 used to provide a minimal or no horizontal displacement of the bracket from the wall.
FIG. 11 illustrates the bracket of FIG. 1 and the wedge of FIG. 6 used to provide a maximum horizontal displacement of the bracket from the wall.
Figures 12, 13:
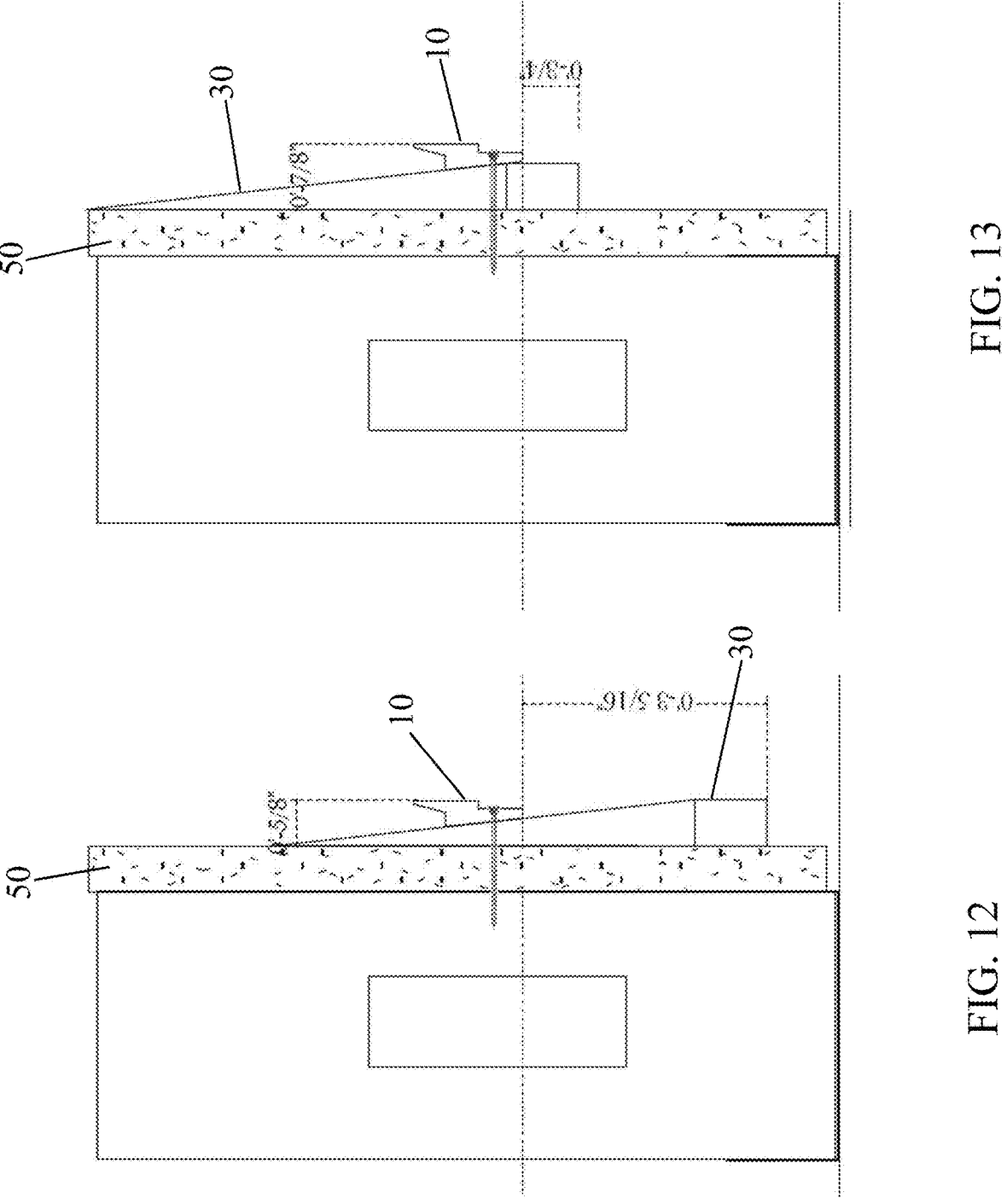
FIG. 12 illustrates the bracket of FIG. 1 and the wedge of FIG. 7 used to provide a minimal or no horizontal displacement of the bracket from the wall.
FIG. 13 illustrates the bracket of FIG. 1 and the wedge of FIG. 7 used to provide a maximum horizontal displacement of the bracket from the wall.

FIGS. 10 and 11 show how the wedge 30 can be positioned to provide zero horizontal displacement (FIG. 10) and a maximum horizontal displacement (FIG. 11). Thus, the wedge 30 can move the distal end 21 of the bracket 10 from about ⅜ inch from the wall to about ⅝ inch from the wall. FIGS. 12 and 13 show how the wedge 30A can be positioned to provide zero horizontal displacement (not shows), and can further provide a horizontal displacement from the end of the range of wedge 30 (FIG. 12) to a maximum horizontal displacement (FIG. 13). Thus, the wedge 30A can move the distal end 21 of the bracket 10 from about ⅜ inch from the wall (not shown) to about ⅝ inch from the wall (FIG. 12) and beyond to about ⅞ inch from the wall (FIG. 13). As described above, the horizontal displacement is continuously variable, where any distance between zero and the maximum displacement provided by the wedge 30 can be chosen simply by sliding the wedge behind the bracket 10.

Figures 14B, 14C:
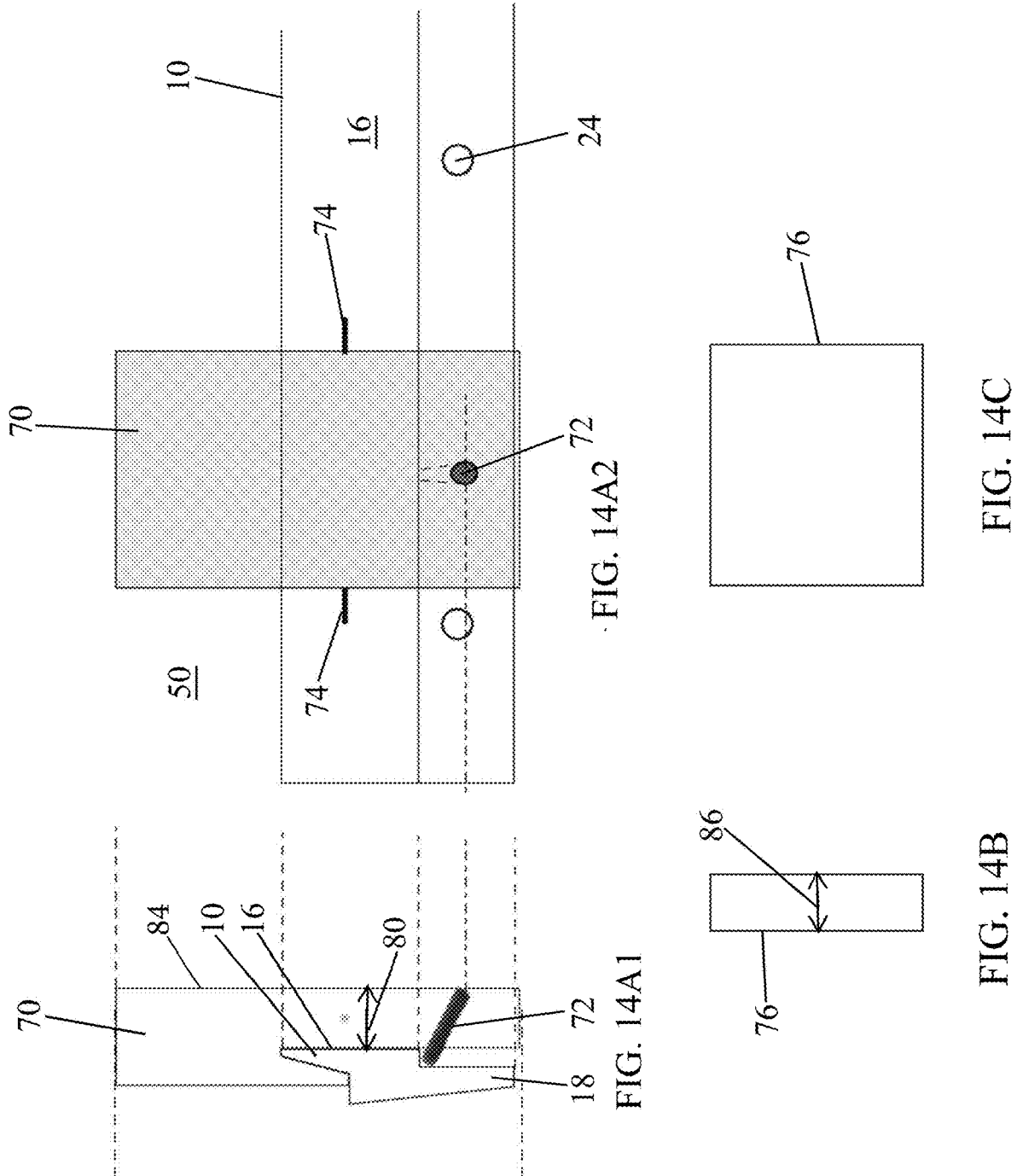
FIG. 14B illustrates a side view of a matching offset block for horizontally aligning the bracket(s) of FIG. 1 along a wall.
FIG. 14C illustrates a front view of the matching offset block of FIG. 14B.

Referring now to FIGS. 14A1 through 15, in some embodiments, a system for mounting items to a wall can include not only the bracket 10 and the wedge 30, as described above, but also a quick offset block 70 and a matching offset block 76 (see FIGS. 14B and 14C). The quick offset block 70 may be configured to attach to the bracket 10, as shown in FIGS. 14A1 and 14A2, where a front face 84 of the quick offset block 70 is positioned a distance 80 away from the front side 16 of the bracket 10. A block retainer 72 may extend to a position under the main body 12 of the bracket 10 to temporarily secure the quick offset block 70 onto the bracket 10 during use thereof. The quick offset block 70 can include tie arms 74 extending from each side of the quick offset block 70. The tie arms 74 may be positioned at a central region of the front side 16 of the bracket 10 when the quick offset block 70 is positioned on the bracket 10, as shown in FIG. 14A2.

Figure 15:
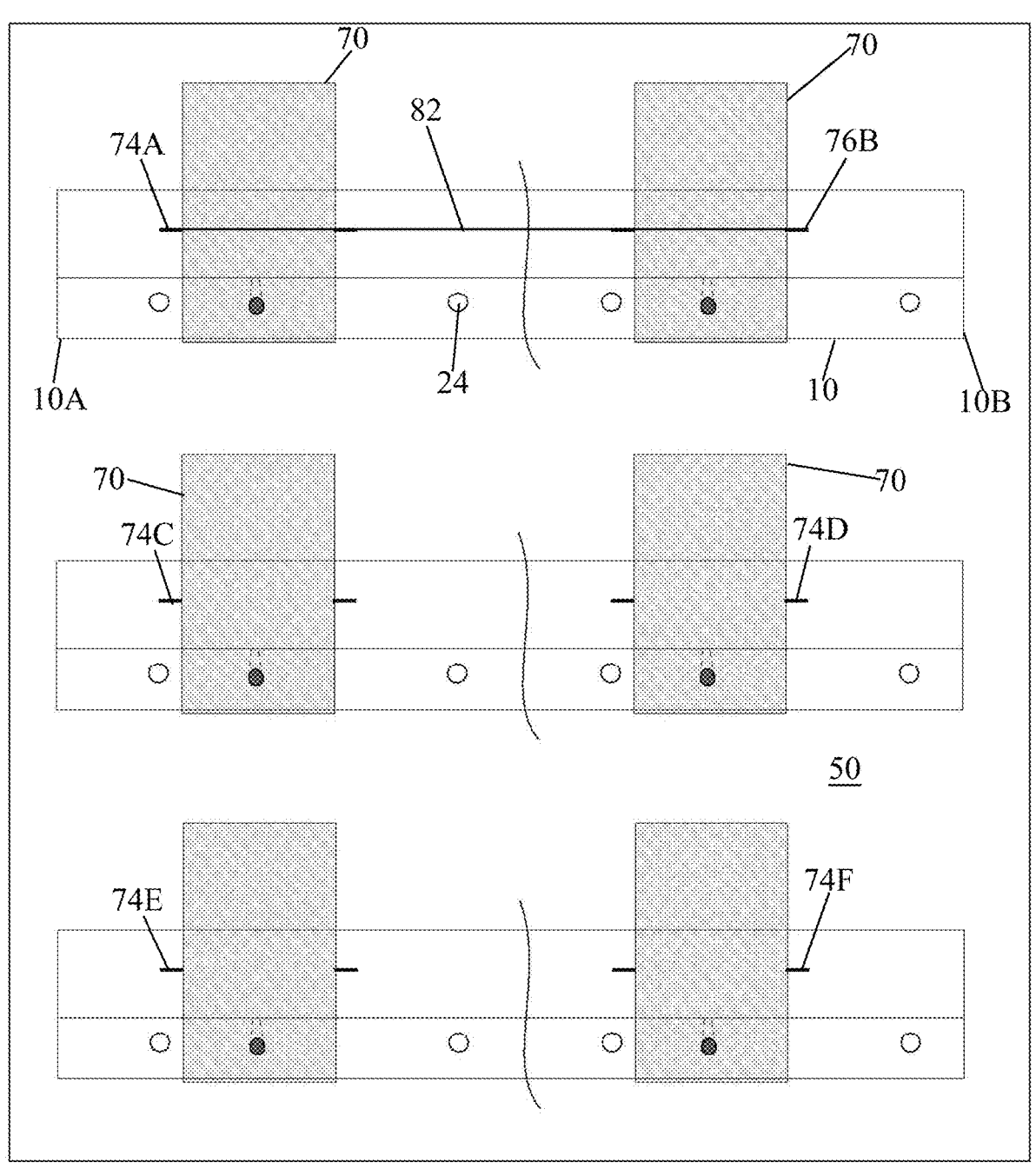
FIG. 15 illustrates a schematic representation of the bracket of FIG. 1 applied to a wall, with the quick offset blocks applied thereto and a string extending from end to end of each row of brackets, according to an exemplary method of the present invention.

As shown in FIGS. 15 and 16, according to an exemplary method 88 of the present invention, one or more brackets 10 can be placed in one or more rows on the wall (step 90) and wedges 30 can be placed at spaced apart locations behind the bracket 10 (step 92). Typically, the wedges 30 are placed at positions of studs in the wall, but the wedges may be placed at any location behind the brackets 10. Typically, the wedges 30 are spaced apart from 12-16 inches from each other behind the bracket 10. A quick offset block 70 can be positioned at a first end 10A of the bracket 10 and at a second end 10B of the bracket 10 (step 94). A string 82 may be tightly extended between tie arm 74A to tie arm 74B (step 96). The matching offset block 76, which has a thickness 86 that matches the distance 80 (see FIGS. 14A1 and 14A2), can be positioned against the front side 16 of the bracket, behind the extended string. If the matching offset block 76 moves the string 82 outward, away from the front side 16 of the bracket, then one of the ends 10A, 10B of the bracket 10 needs to be horizontally displaced away from the wall 50 via sliding the wedge 30 further under the bracket 10, as discussed above. If there is a gap between the matching offset block 76 and the string 82, then the wedge 30 needs to be slid under the bracket 10 at this location to horizontally displace the bracket 10 from the wall 50. The bracket 10 can be aligned in a vertical reference plane when the matching offset block 76 can be positioned along an entirety of the length of the string 82, between the two quick offset blocks 70 at each end 10A, 10B of the bracket 10, without any gap between the string 82 and the matching offset block 76 and without any displacement of the string 82 by the matching offset block 76, as summarized in step 98, which describes adjusting the position of each wedge 30 to provide a constant spacing between the string 82 and the bracket 10.

In some embodiments, in place of the matching offset block 76, multiple ones of the quick offset block 70 may be used along the length of the bracket 10 to ensure vertical reference plane alignment thereof.

When more than one row is present, as shown in FIG. 15, the quick offset blocks 70 in each column (at the first end 10A and the second end 10B of the bracket 10) can first be aligned, then each row can be aligned in the manner discussed above, wherein the string may be run between tie arms 74C and 74D and between tie arms 74E and 74F.

While FIG. 15 illustrates the use of a bracket 10 that extends a length along the wall 50, where this length may be from about 2 feet to about 8 feet or longer, the system and methods discussed above can also be applied to individual brackets placed on a wall. For example, a bracket that is about 2 inches in length may be placed on each stud. The bracket at the first end of the wall and the bracket at the second of the wall may be placed first, and the string 82, described above, may be extended between quick offset blocks 70 placed on these end brackets. The additional brackets may then be placed along the string line, at each stud (or positioned as desired), for example, and the wedges can be used to ensure that each bracket is aligned in a single vertical reference plane.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A mounting system comprising:
   a bracket, the bracket including:
      a main body having a main body front side and a main body back side;

a lower portion, extending from and formed integrally with the main body, the lower portion having a lower portion front side and a back side, the lower portion front side and the back side defining non-parallel planes, the back side being continuous and linear with the main body back side, the back side of the lower portion and the main body back side defining a bracket back side configured for placement against a surface; and an upper portion extending in a direction opposite the lower portion, wherein a back side of the upper portion is spaced away from the surface when the lower portion is attached to the surface; and a quick offset block, the quick offset block being removably attachable to the bracket and having a front face that is parallel to and spaced apart from the front side plane when the quick offset block is attached to the bracket, wherein the quick offset block includes a tie arm extending outward from opposite sides thereof.

2. The mounting system of claim 1, wherein the bracket back side forms a bracket angle with the front side plane from about 4 degrees to about 10 degrees.

3. The mounting system of claim 2, further comprising a wedge, the wedge comprising:

a wedge back side configured to be positioned against the surface, with at least a portion of the wedge back side being disposed between the bracket back side and the surface; and a wedge front side configured to be slidable along the bracket back side, wherein the wedge back side and the wedge front side form a wedge angle to provide a continuously increasing thickness along a length of the wedge, from a tip end to a distal end thereof.

4. The mounting system of claim 3, wherein the wedge further includes a non-sloped portion, at the distal end thereof, where the wedge front side is parallel to the wedge back side at the non-sloped portion.

5. The mounting system of claim 4, wherein the wedge further includes a slot extending along a portion of the length of the wedge, from the tip end and ending at or into the non-sloped portion, the slot extending through the wedge, from the wedge back side to the wedge front side.

6. The mounting system of claim 5, wherein the slot aligns with a hole in the tapered lower portion of the bracket.

7. The mounting system of claim 3, wherein the wedge angle matches the bracket angle.

8. The mounting system of claim 3, wherein the front side plane is parallel to the surface when the wedge is positioned between the surface and the bracket.

9. The mounting system of claim 1, wherein the tie arm is positioned in front of the front side plane when the quick offset block is positioned on the bracket.

10. A mounting system comprising:

a bracket comprising:

a main body having a main body front side and a main body back side;

a lower portion, extending from and formed integrally with the main body, the lower portion having a back side continuous and linear with the main body back side, the back side of the lower portion and the main body back side defining a bracket back side configured for placement against a surface;

an upper portion extending in a direction opposite the lower portion, wherein a back side of the upper portion is spaced away from the surface when the lower portion is attached to the surface, wherein the bracket back side is disposed non-parallel to a front side plane defined by a front side of the upper portion and the main body front side; and a wedge comprising:

a wedge back side configured to be positioned against the surface, with at least a portion of the wedge back side being disposed between the bracket back side and the wall; and a wedge front side configured to be slidable along the bracket back side, wherein:

the wedge back side and the wedge front side form a wedge angle to provide a continuously increasing thickness along a length of the wedge, from a tip end to a distal end thereof; and a position of the wedge relative to the bracket provides a continuously variable horizontal displacement of the bracket from the surface; and a quick offset block, wherein:

the quick offset block being removably attachable to the bracket and having a front face that is parallel to and spaced apart from the front side plane when the quick offset block is attached to the bracket;

the quick offset block includes a tie arm extending outward from opposite sides thereof; and the tie arm is positioned in front of the front side plane when the quick offset block is positioned on the bracket.

11. The mounting system of claim 10, wherein:

the bracket back side forms a bracket angle with the front side plane from about 4 degrees to about 10 degrees; and the wedge angle matches the bracket angle.

12. The mounting system of claim 10, wherein the wedge further includes a slot extending along a portion of the length of the wedge, from the tip end and ending at or into the non-sloped portion, the slot extending through the wedge, from the wedge back side to the wedge front side.

13. The mounting system of claim 10, wherein the front side plane is parallel to the surface when the wedge is positioned between the surface and the bracket.

14. A method of attaching one or more brackets on a surface in a single vertical reference plane, the method comprising:

placing the one or more brackets horizontally along the surface in a first row, each of the one or more brackets comprising:

a main body having a main body front side and a main body back side;

a lower portion, extending from and formed integrally with the main body, the lower portion having a back side continuous and linear with the main body back side, the back side of the lower portion and the main body back side defining a bracket back side, the lower portion having a hole with a fastener extending therethrough for attaching the one or more brackets on the surface;

an upper portion extending in a direction opposite the lower portion, wherein a back side of the upper portion is spaced away from the surface when the lower portion is attached to the surface, wherein the bracket back side is disposed non-parallel to a front side plane defined by a front side of the upper portion and the main body front side; and placing one or more wedges between each of the one or more brackets and the surface, each of the one or more wedges comprising:

a wedge back side positioned against the surface, with at least a portion of the wedge back side being disposed between the bracket and the wall;

a wedge front side slidable along the bracket back side; and a slot extending along a portion of the length of the wedge, from a tip end thereof, the slot extending through the wedge, from the wedge back side to the wedge front side, wherein:

the wedge back side and the wedge front side form a wedge angle to provide a continuously increasing thickness along a length of the wedge, from a tip end to a distal end thereof;

sliding each of the one or more wedges, with the slot aligned with the fastener, to provide a horizontal displacement of each of the one or more brackets to position each of the one or more brackets along the single vertical reference plane;

removably attaching a quick offset block to each of the one or more brackets, wherein the quick offset block has a front face that is parallel to and spaced apart from the front side plane; and extending a string from a tie arm of a first quick offset block at one side of the first row to a second quick offset block at an opposite side of the first row; and using the string to align the one or more brackets in the single vertical reference plane by adjusting a sliding position of each of the plurality of wedges behind each of the one or more brackets.

15. The method of claim 14, wherein:

the bracket back side forms a bracket angle with the front side plane from about 4 degrees to about 10 degrees; and the wedge angle matches the bracket angle.

16. The method of claim 14, wherein the wedge aligns the upper portions of each of the one or more brackets at a uniform horizontal distance from the surface.

* * * * *